United States Patent

Oura et al.

Patent Number: 5,478,172
Date of Patent: Dec. 26, 1995

[54] APPARATUS FOR FEEDING ULTRAFINE POWDER IN QUANTITATIVE BATCH OPERATION

[75] Inventors: Tetsuo Oura; Mitsuo Sato; Yasuyuki Saito; Ken-ichi Mase; Kenzo Kitazawa; Hayao Aoyagi; Toru Okuno; Toshio Yonezawa; Kenro Mitsui, all of Tokyo, Japan

[73] Assignees: Keihin Ryoko Concrete Ind. Corp.; Mitsubishi Materials Corp., both of Tokyo; Takenaka Corporation, Osaka, all of Japan

[21] Appl. No.: 150,136
[22] PCT Filed: Mar. 29, 1993
[86] PCT No.: PCT/JP93/00382
§ 371 Date: Jun. 23, 1994
§ 102(e) Date: Jun. 23, 1994
[87] PCT Pub. No.: WO93/21092
PCT Pub. Date: Oct. 28, 1993

[30] Foreign Application Priority Data

Apr. 13, 1992 [JP] Japan .................. 4-092600

[51] Int. Cl.$^6$ .................................. B65G 53/66
[52] U.S. Cl. .................. 406/23; 406/28; 406/33; 406/56; 406/65; 406/90; 406/106; 406/109; 406/124; 406/134; 406/146; 406/156; 406/171; 406/173; 406/175; 406/181
[58] Field of Search .................... 406/10, 12, 19, 406/21, 23, 28, 29, 31, 32, 33, 53, 56, 62, 63, 65, 86, 89, 90, 106, 108, 109, 122, 124, 125, 126, 127, 128, 134, 136, 137, 144, 146, 154, 155, 156, 168, 171, 172, 173, 175, 181, 191, 192

[56] References Cited

U.S. PATENT DOCUMENTS

| | | | |
|---|---|---|---|
| 1,669,084 | 5/1928 | Grindle | 406/33 X |
| 2,657,100 | 10/1953 | Weller | 406/90 |
| 3,671,079 | 6/1972 | Huffaker | 406/137 |
| 3,797,890 | 3/1974 | Walters | 406/33 |
| 3,929,261 | 12/1975 | Solimar | 406/137 X |
| 4,089,563 | 5/1978 | Neu | 406/138 X |
| 4,345,858 | 8/1982 | Barlow | 406/33 X |
| 4,940,131 | 7/1990 | Swartz | 198/524 |

FOREIGN PATENT DOCUMENTS

| | | |
|---|---|---|
| 455809A1 | 11/1991 | European Pat. Off. . |
| 2413297 | 7/1979 | France . |
| 48-39332 | 11/1973 | Japan . |
| 54-129684 | 10/1979 | Japan . |
| 61-295925 | 12/1986 | Japan . |
| 2012438 | 7/1979 | United Kingdom . |

*Primary Examiner*—Andrew C. Pike
*Attorney, Agent, or Firm*—Oliff & Berridge

[57] ABSTRACT

Ultrafine powder is stored in a pneumatic transportation tank (20), and is discharged to a transporting conduit (23) while being fluidized by the pressurized air fed through a fluidizing air port (24). The ultrafine powder is fed to a weigher (30) provided at the other end of the transporting conduit (23), at which the weight of the transported ultrafine powder is weighed by a load cell (31). After the weighed value reaches 90% of a predetermined value, the fed amount of the pneumatic transportation air is reduced, and a bypass regulating valve (38) is adjusted to thus decelerate the transportation. When the weighed value reaches 100% of the predetermined value, the discharge of the ultrafine powder to the transporting conduit (23) is stopped. This method and the apparatus enable the storage, quantitative batch transportation, and automatic weighing of the ultrafine powder such as silica fume.

4 Claims, 3 Drawing Sheets

APPARATUS FOR FEEDING ULTRAFINE POWDER IN QUANTITATIVE BATCH OPERATION

FIELD OF THE INVENTION

The present invention relates to a handling technique, for example, storage, transportation, and automatic weighing for ultrafine powder such as silica fume or neofume.

BACKGROUND OF THE INVENTION

Silica fume exists in the form of ultra fine powder with a fineness having a specific surface of 5–100 $m^2/g$ and a bulk density of 100–400 $kg/m^3$. Namely, the silica fume is significantly fine as compared with Portland cement usually having a specific surface of 0.3 $m^2/g$. When the silica fume is added in concrete in combination with a superplaticizer and the so-called dispersant such as a high performance water reducing agent in kneading the concrete, the fine particles thereof are dispersed in the concrete and thus densely fill the voids of the concrete. Also, since the silica fume has a high activity and is in the form of ultrafine powder, it promotes the pozzolan reaction with cement in concrete. Further, even in the silica fume-rich blending, owing to the characteristic of the ultrafine powder, the silica fume contributes to easily manufacture the concrete having a small water-cement ratio and a high strength.

Neofume exists in the form of ultrafine powder, which is obtained by fly ash, with a fineness having a specific surface of 20–130 $m^2/g$, and has the same characteristics as the silica fume.

In ready mixed concrete factories, the ultrafine powder of this type has been steadily used in the form of: in U.S.A, being made in the slurry; or in Norway, for facilitating the handling thereof, being granulated by aeration with the air blown into a storage silo. In the case of being made in the slurry, since the blending ratio is determined by volume, the blending amount by weight of the added ultrafine powder is obscure, which is unsuitable for the actual standard in Japan. Also, in the case of being granulated, as a result of the research by the present inventors, it has been revealed that the silica fume cannot fully achieve the performance as the ultrafine powder in concrete (Effect of physical properties of silica fume on the properties of high strength concrete; Annual Report of Concrete Engineering, 13-1, pp. 291–296, (1991)).

When being stored in a silo, the ultrafine powder induces the bridging phenomenon, and is difficult to discharge therefrom. For preventing bridging in a vertical silo, there has been proposed the aerating technique described above: however, it is inconvenient as it granulates the ultrafine powder. Also, the ultrafine powder has a problem that, when being released in the air, it is suspended in the air and remarkably scattered. Further, in the case of discharging the ultrafine powder from the silo, transporting it, and mixing it in concrete, it is not easy to feed a specified amount of the ultrafine powder for a short time, automatically weighing it, and feeding it in a concrete mixer. The reason for this is as follows:

(1) The amount of the ultrafine powder discharged from the silo greatly deviates as a factor of time, according to bridging etc.
(2) To vertically lift the ultrafine powder with a screw conveyor or the like, the conveyor must be usually filled therewith; however, the steady feed of the ultrafine powder is difficult to achieve.
(3) Accordingly, it is necessary to provide an intermediate tank for storing a specified amount of the ultrafine powder therein and discharging therefrom.
Also, in the case that the discharging line from the intermediate tank includes the vertically upward transportation of powder, the quantitative transportation must be contrived.
(4) In the case of (3), even when the ultrafine powder is weighed before the transportation, the transported amount cannot be recognized, because it is affected by the amount remaining in the transporting conduit.

Also, generally, in the case of installing an ultrafine powder feeding apparatus on the existing concrete batcher plant, the installation is liable to be greatly restricted by the narrow installation space.

It is very difficult to handle the ultrafine powder. Conventionally, this has been solved by the slurry-making or granulating technique.

SUMMARY OF THE INVENTION

An object of the present invention is to provide a technique of handling ultrafine powder in a dry process without granulation.

The problems to be solved by the invention is as include:

(a) The ultrafine powder is difficult to be transport in a quantitative batch operation. Particularly, by the use of conventional transporting means, in upward transportation, the amount of the ultrafine powder that remains in the transporting conduit is greatly varied.
(b) For the deposited ultrafine powder, air bleeding is promoted, which causes a compaction phenomenon, even by a little vibration, resulting in the aggregation of the ultrafine powder. This makes it very difficult to store the ultrafine powder in a vertical silo and to discharge it therefrom. The aeration is undesirable because of the granulation effect.
(c) In a simple pneumatic transportation system using pressurized air, it is difficult to transport the ultrafine powder because of the blocking of the pipe. Further, in the case of pneumatic transportation of a specified amount of the ultrafine powder in batch operation, there is arisen such a problem that, even if the ultrafine powder in a specified amount is previously weighed and then pneumatically transported, the weighed value is varied at the destination to be transported.
(d) Even in the case of using the general transporting means of the other types, it is difficult to perform the quantitative transportation as described above.

To solve the above problems caused in using the ultrafine powder, such as the impossible discharge from the storage silo, the blocking of pipes in pneumatic transportation or the difficulty weighing in pneumatic transportation, the present inventors have earnestly studied, and consequently found the method for solving the above problems. Namely, an object of the present invention is to provide a technique of easily using the above-described ultrafine powder in a concrete batcher plant, in the non-granulated state, without harming the performance thereof, in a dry process, and under the severe management of blending by weight.

To achieve the above object, the present invention provides for the following technical means. Namely, the present invention basically provides a method for feeding ultrafine powder in quantitative batch operation, comprising the steps of: storing the ultrafine powder in a pneumatic transportation tank; feeding pressurized air into the pneumatic transportation tank near the bottom part of the tank for discharging the ultrafine powder into a transporting conduit while fluidizing the ultrafine powder in order to easily discharge it from the tank; transporting it to the other end of the transporting conduit by the pressurized air; weighing the weight of the transported ultrafine powder at the other end of the transporting conduit; and feeding a specified amount of the ultrafine powder to the destination to be fed, for example, a concrete batcher plant.

In the present invention, there is a technique of weighing the stored ultrafine powder in the amount more than that to be fed to the destination, and feeding a specified amount thereof to the destination calculated by subtracting the weighed value at the other end from weight of the stored powder.

The present invention provides another method for feeding ultrafine powder in quantitative batch operation, comprising the steps of: pneumatically transporting the ultrafine powder; continuously weighing the weight of the transported ultrafine powder during the transportation at the destination to be pneumatically transported; and controlling the transported amount such that the continuously weighed value corresponds to the predetermined programmed value. In the above method, it is possible to achieve an accurate weight of the ultrafine powder to be transported to the end of the transportation, by stopping the transportation when the above continuously weighed value reaches the final predetermined value to be weighed, and by feeding all of the final weighed value to the destination to be transported. This program is not limited; but is preferably selected such that the transportation is decelerated when the above weighed value reaches a specified ratio (e.g. 90%) of the final predetermined value to be weighed, and the transportation is stopped when the above continuously weighed value reaches the specified final predetermined value. The means for decelerating the transportation may be constituted of any one, or a combination of two or more selected from the group consisting of: a means for reducing the amount of the ultrafine powder discharged to the transporting conduit; a means for reducing the amount of the pressurized air fed into the system; and a means for returning part of the transported amount to the storage silo through a bypass conduit and for adjusting the bypassed amount.

The apparatus for feeding ultrafine powder in quantitative batch operation suitably embodying the present invention includes an ultrafine powder pneumatic transportation unit and a weigher provided at the end of the pneumatic transportation unit for weighing the weight of the pneumatically transported ultrafine powder. The weigher has a pnuematic conveying unit on the bottom thereof. This weigher can be easily installed on the existing concrete batcher plant by mounting an atmosphere shielding unit at the discharge end of the pneumatic conveying unit.

The whole construction of the apparatus for feeding ultra fine powder in quantitative batch operation for embodying the above method includes:

(a) an ultrafine powder storage silo;

(b) a pneumatic transportation tank provided with a receiving unit for receiving ultrafine powder from the storage silo and a pressurized air feeding unit;

(c) a discharge unit for discharging ultrafine powder from the pneumatic transportation tank;

(d) a pneumatic transportation conduit for pneumatically transporting the discharged ultrafine powder;

(e) a weigher mounted at the other end of the pneumatic transportation conduit for receiving the pneumatically transported ultrafine powder, weighing it, and feeding it to the destination to be fed;

(f) a return conduit extending from the weigher to the ultrafine powder storage silo;

(g) a bypass conduit for connecting the above pneumatic transportation conduit with the return conduit through a regulating valve; and (h) a control unit for controlling the amount of the ultrafine powder discharged from the pneumatic transportation tank, the amount fed of the pressurized air, and the opening of the regulating valve in the bypass conduit on the basis of the weighed value at the weigher.

The ultrafine powder storage silo is laterally disposed. Ultrafine powder transferring units are horizontally provided on the lower bottom portion and the upper portion from the intermediate step within the silo, respectively. The inner height of the silo is 5.0 m or less. When the height is more than 5.0 m, there occurs the bridging phenomenon due to the compaction, which makes the discharge of the ultrafine powder therefrom difficult. The height of the silo is preferably 2.0 m or less, and further, under the consideration of the movement of the ultrafine powder transferring units, it may be 1.8 m or less. Also, for making the discharge of the ultrafine powder easier, a vibration exciter may be mounted on the outer wall near the ultrafine powder transferring unit provided on the lower bottom portion of the ultrafine powder storage silo. The mis-selection of the vibration exciter brings about the adverse effect, which makes the discharge of the ultrafine powder more difficult. Accordingly, it is important to suitably select the vibration exciter according to the condition of the storage silo.

The apparatus of the present invention can be used as the movable plant by forming it with a size capable of being mounted on the load-carrying platform of a truck running on the road, while being in the used-condition or disassembled and packaged.

DESCRIPTION OF THE PREFERRED EMBODIMENT

In the present invention, since ultrafine powder is pneumatically transported in a dry process without granulating it, it is possible to sufficiently achieve the excellent properties of the ultrafine powder without harming them. Also, by weighing the ultrafine powder at the destination of the transportation, it is possible to transport an accurate amount of the ultrafine powder to the destination, even when the transporting amount remains in the pneumatic transportation conduit according to the condition of the pneumatic transportation conduit.

Also, according to the present invention, as the ultrafine powder is fluidized in the pneumatic transportation tank, it is possible to easily discharge it from the pneumatic transportation tank, and to pneumatically transport it without any blocking occurring in the transporting pipe.

Figure 2:
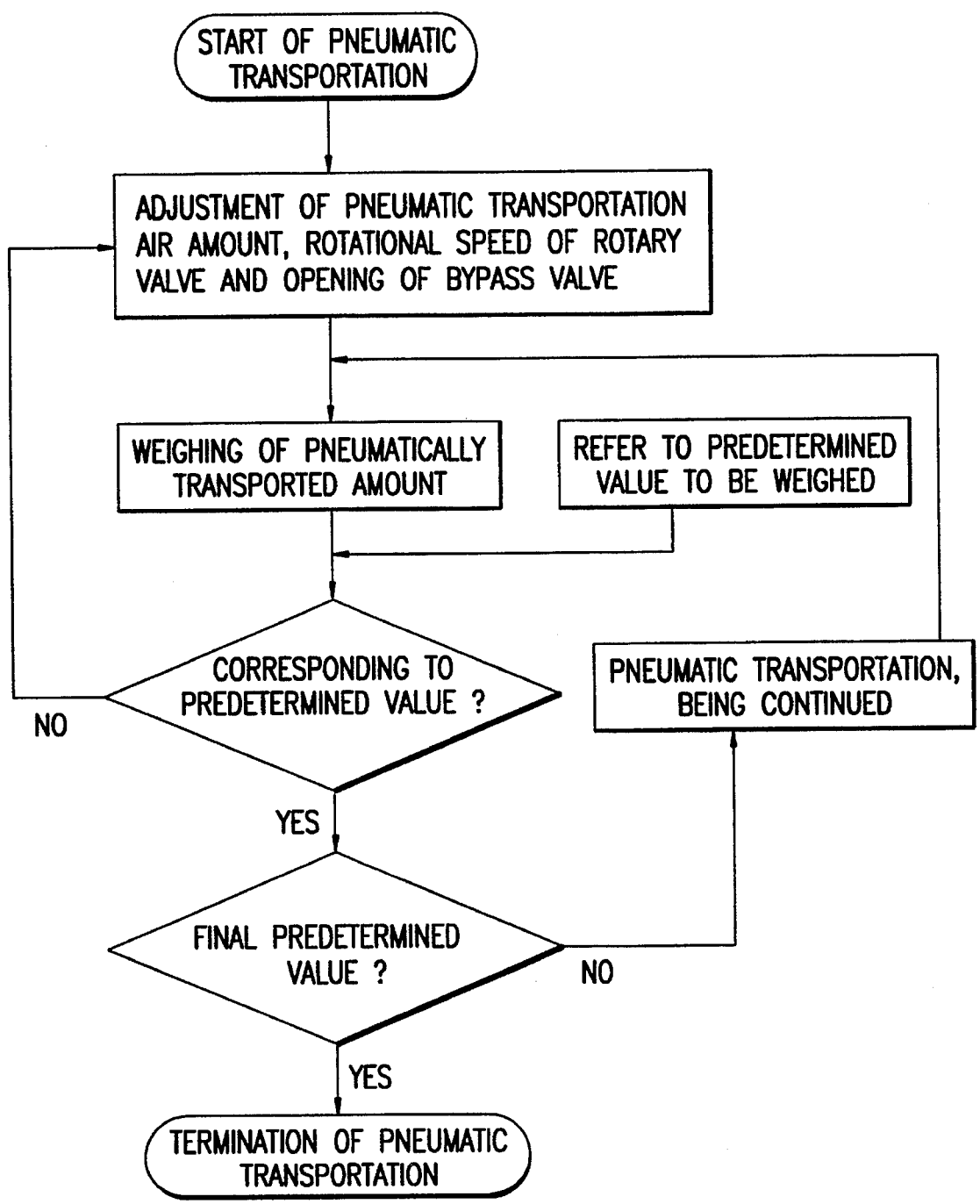
FIG. 2 is a flow chart of the embodiment according to the present invention.

The pneumatically transported ultrafine powder is stored in the weigher and is weighed. In this case, there is determined a program having a specified transition of the weighed values, for example, a predetermined transporting curve. Thus, the transported amount is increased/decreased in correspondence with the predetermined transporting curve. Referring to the flow chart as shown in FIG. 2, there will be explained a control method comprising the steps of pneumatic transporting the ultrafine powder; continuously weighing the transported ultrafine powder at the destination to be pneumatically transported during transportation; and controlling the transported amount such that the continuously weighed value corresponds to the predetermined program. The pneumatic transportation is started and the pneumatically transported amount is weighed. With reference to a predetermined value, it is determined whether or not the pneumatically transported amount corresponds to the predetermined value. If the amount does not, the pneumatically transported amount is adjusted to correspond to the predetermined value by controlling the means for adjusting amounts transported, such as the amount of pneumatic transporting air, the rotational speed of a rotary valve, and the opening of the bypass valve. In the case that the final predetermined value is set in the weigher, it is determined whether or not the pneumatically transported amount reaches the final predetermined value to be weighed. If the amount is not reached, the pneumatic transportation is continued, and the above control is also continued. Upon reaching the final predetermined value to be weighed, the pneumatic transportation is stopped.

Figure 3:
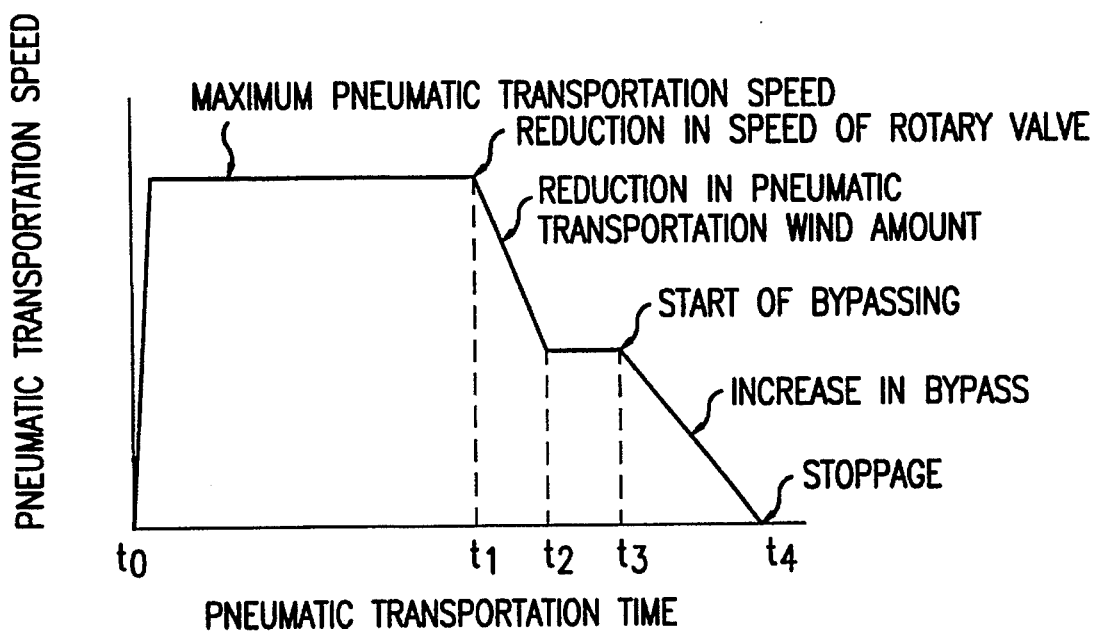
FIGS. 3 and 4 are flow curves showing one of programs of the embodiment according to the present invention.
Figure 4:
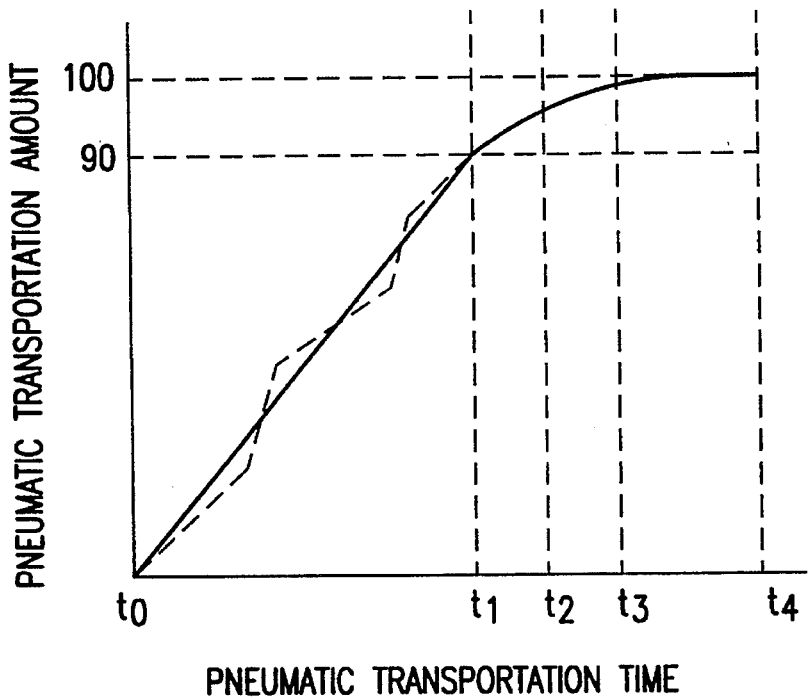

In the predetermined program, for example, after the weighed value reaches a specified ratio (e.g. 90%) of the final predetermined value, the amount of the pneumatic transporting air fed is reduced and the transportation is decelerated, thereby finely adjusting the transported amount. Thus, when the weighed value reaches the final predetermined value, the discharge of the ultrafine powder to the transporting conduit is stopped. FIG. 3 is a typical time-chart of one program showing a pneumatic transporting curve and FIG. 4 is a pneumatically transported amount curve with respect to the pneumatic transportation time. The broken line shown in the pneumatically transported amount curve is typically depicted by emphasizing a status that the actual pneumatically transported amount is controlled to correspond to the predetermined curve depicted as a solid line. Until the pneumatically transported amount reaches 90% of the predetermined amount, the pneumatic transportation is performed at the maximum pneumatic transportation rate. Thus, when the pneumatically transported amount reaches 90% of the predetermined amount, the transportation is decelerated by decreasing the rotational speed of the rotary valve, reducing the pneumatic transporting air amount, and releasing the bypass valve, such that the transported amount corresponds to 100% of the final predetermined amount.

Figure 1:
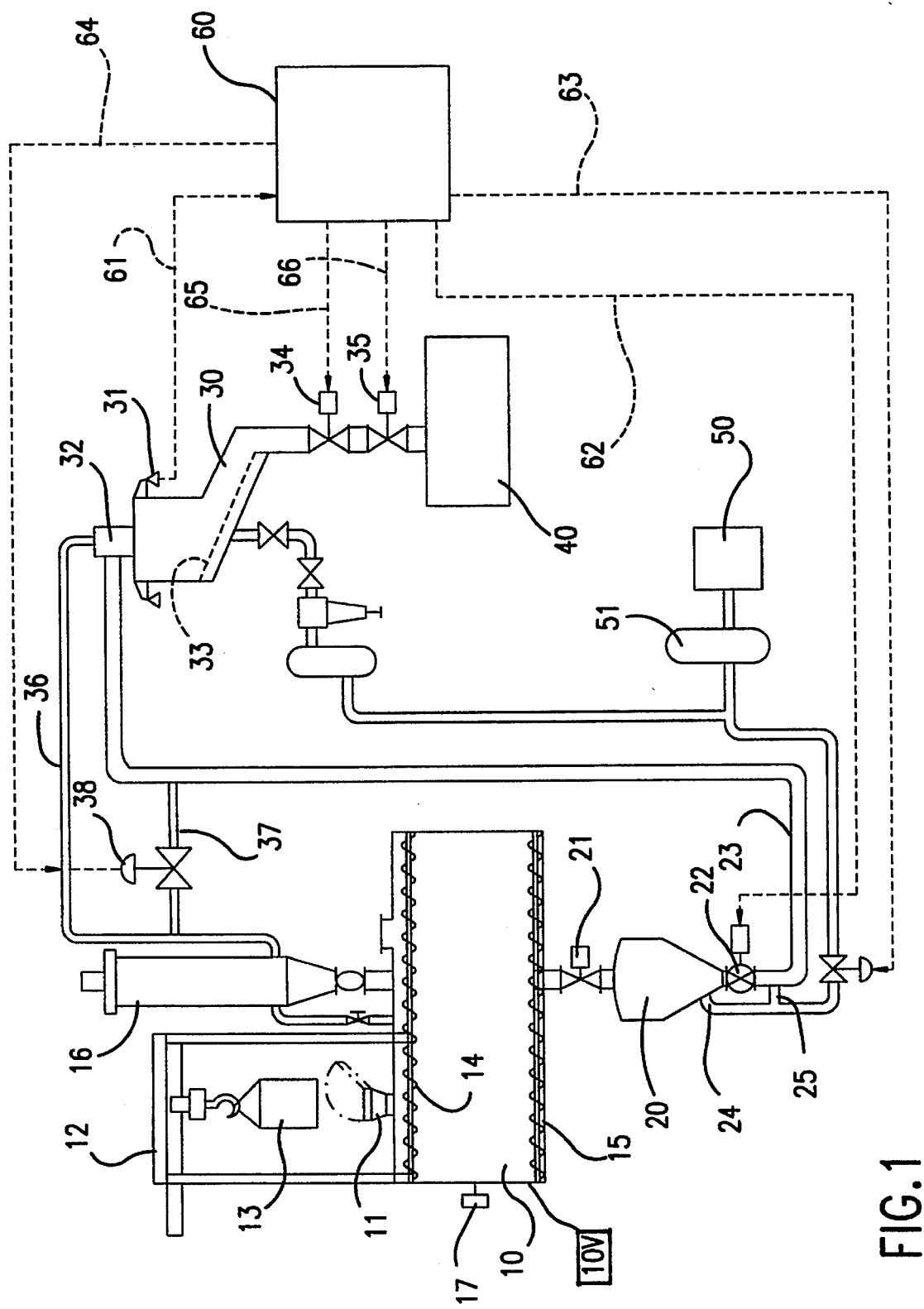
FIG. 1 is a whole construction view of an embodiment according to the present invention.

FIG. 1 is a whole flow diagram according to the embodiment of an apparatus for feeding ultrafine powder in quantitative batch operation. The apparatus includes a storage silo 10, a pneumatic transportation tank 20, a weigher 30, a concrete mixer 40, an air compressor 50, and a control unit 60.

The storage silo 10 is constituted of a lateral silo 10 having an inner height of 1.8 m or less for preventing the aggregation of the ultrafine powder, and smoothly discharging it without granulation. If the inner height was more than 1.8 m, when the ultrafine powder remains in the silo for a long period, for example, three days or more, the ultrafine powder would be compacted and be difficult to be discharged. Agitation by aeration or the like is undesirable because of the granulation that would be generated.

The supply of the ultrafine powder into the storage silo 10 can be performed by use of a flexible container bag and a pneumatic transportation carrier. FIG. 1 shows a supply or carry-in port 11, a flexible container bag 13, and a hanging unit 12. For making the supply of the ultrafine powder to the silo 10 easier, a transferring screw conveyor 14 is provided upwardly of the intermediate step of the storage silo 10. In the storage silo 10, for making the discharge of the ultrafine powder smooth, each of the side walls has at least a slope being inclined at 60 degrees to the horizontal line. Also, for discharging the ultrafine powder, a discharging screw conveyor 15 is provided within the storage silo 10. Further, in the storage silo 10 of this embodiment, four of the vibrators, schematically represented by block 10V, each having a vibration frequency of 100 kHz and an output of 75 W are mounted on the outer wall near the discharging screw conveyor. The storage silo 10 includes a bag filter 16 and an in-silo level meter 17.

The pneumatic transportation tank 20 is disposed under the silo 10 for storing a specified amount of powder and pneumatically transporting it to the weigher 30 in a batch operation. The pneumatic transportation tank 20 has a compressed air blowing port 24. The compressed air blown through the blowing port 24 keeps the ultrafine powder in the fluidized state, thus facilitating the discharge thereof. Also, the pneumatic transportation tank 20 includes a rotary valve 22 for feeding the ultrafine powder to a transporting conduit 23. The transporting conduit 23 is intended to transport the ultrafine powder, and has a compressed air feed port 25 on the pneumatic transportation tank side. The compressed air used for pneumatic transportation is fed by an air compressor 50 and an air tank 51, and at least has a pressure of 200 kPa and is dried.

The ultrafine powder is pneumatically transported from the pneumatic transportation tank 20 to the weigher 30 provided over the concrete mixer 40 through the transporting conduit 23. The weighing is carried out by use of a load cell 31 additionally provided on the weigher 30. The rotation of the rotary valve 22 is started by the weighing start signal, and it is automatically controlled to be reduced at 90% of the predetermined weighed value, and is stopped at 100% of the predetermined value. The pneumatic transportation air passes through an air feeding tube 36 from a separator 32 provided on the weigher 30 and returns to the bag filter 16. Also, the air feeding tube 36 is connected with transporting conduit 23 through a bypass conduit 37. In this case, when the weighed value reaches 90% of the predetermined value to be weighed, the opening of the regulating valve provided on the bypass conduit 37 is adjusted, and when reaching 100% of the predetermined value, it is full opened. Thus, it is possible to maintain the accuracy of the weighing and to prevent scattering of the ultrafine powder.

The weigher 30 has a separator 32 on the upper portion thereof, and also a vibrator and a discharging pneumatic conveyor 33 for securing the holding and discharge of the ultrafine powder. The discharging pneumatic conveyor 33 is able to perfectly discharge the full amount of the ultrafine powder in the weigher 30.

Since the discharging pneumatic conveyor 33 enables the slightly tilted transportation, the weigher 30 can be easily installed on an existing batcher plant without any space over the mixer. Further, under a discharge cut gate 34 of the weigher 30, there is provided a moisture preventive gate 35, which acts as an atmosphere shielding unit for preventing the moisture from the mixer 40. The moisture preventive gate 35 prevents the ultrafine powder from sticking on the wall surface or the like, particularly, prevents the discharging pneumatic conveyor 33 from suffering a discharge defective due to the moisture.

The control unit 60 controls the quantitative batch feeding for ultrafine powder according to the present invention. The discharge cut gate 34 and the moisture preventive gate 35 are controlled by the signals 65 and 66 from the control unit 60 respectively. The weight of the weigher 30 is detected by the load cell 31 and received as a signal 61, and adjusts the openings of the regulating valves by the signals 62, 63, and 64, respectively.

The ultrafine powder fed from the flexible container bag 13 is stored in the storage silo 10, discharged, and used. The storage silo 10 includes the transferring screw conveyor 14 and the discharging screw conveyor 15 for feeding the ultrafine powder to the pneumatic transportation tank 20 having an inner capacity of 1 m$^3$. The amount of the ultrafine powder fed by the discharging screw conveyor 15 is inevitably varied due to the bridging and the breakage thereof in the silo 10. Accordingly, a level detector 17 is provided on the pneumatic transportation tank 20 for controlling the start and stoppage of the discharging screw conveyor 15. Also, the number of the transferring screw conveyors 14 is not limited and may be suitably selected according to the size or the like of the silo.

Further, as for the discharging screw conveyor 15, the number and the type may be selected according to the status of the silo.

The apparatus of the present invention can be constructed in small-sized portable units to be mounted on a truck, and therefore, it is applicable for the temporary concrete batcher plant, thus making it possible to enlarge the use of the apparatus.

The operation of the apparatus of the present invention is as follows.

(1) Based on the weighing starting signal, the opening/closing valve 21, provided between the discharging screw conveyor 15 and the pneumatic transportation tank 20 within the storage silo 10, is operated to feed the ultrafine powder to the pneumatic transportation tank 20.

(2) The opening/closing valve 21 of the pneumatic transportation tank 20 is closed, and the air is blown from the compressed air blowing port 24 for fluidizing the ultrafine powder. Subsequently, the operation of the rotary valve 22 is started to discharge the ultrafine powder to the transporting conduit 23, while the pneumatic transporting air is fed from the compressed air feed port 25 to transport the ultrafine powder.

(3) The load cell 31 of the weigher 30 measures the weight of the ultrafine powder, and transmits the signal 61 to the control unit 60. For example, when the transported amount reaches 90% of the desired predetermined value to be weighed, the control unit 60 decelerates the transportation by adjusting the rotational speed of the rotary valve 22 (signal 62), the pneumatic transportation air amount (signal 63), the opening of the bypass regulating valve 38 (signal 64), and the like. Thus, when the control unit 60 recognizes that the transported amount reaches 100% of the desired predetermined value on the basis of the signals from the load cell 31, it stops the transportation. Therefore, it is possible to perform the accurate transportation of the ultrafine powder in specified amounts.

Also, the following control may be performed: namely, when the transported amount reaches 90% of the predetermined value, the rotational speed of the rotary valve is reduced on the basis of the rotational speed control signal, and when it reaches the predetermined value, the operation of the rotary valve is stopped and thereafter the feeding of the pneumatic transporting air is stopped, thereby making it possible to obtain the same weighing accuracy as described above.

(4) When the ultrafine powder is discharged from the weigher 30, the operating air is fed to the pneumatic discharge conveyor 33, and the discharge cut gate 34 and the moisture preventive gate 35 are open, thus feeding a specified amount of the ultrafine powder to the concrete mixer 40.

According to the present invention, it is possible to transport a specified amount of ultrafine powder such as silica fume to an objective plant. Conventionally, in manufacturing concrete, a specified amount of ultrafine powder has been weighed and charged in a bag (20 kg), after which the ultrafine powder has been charged directly in a concrete mixer by manual labor. According to the method and the weigher apparatus of the present invention, it is possible to save manual labor by automation, and further to significantly improve the performance of the concrete because of the enhancement in the weighing accuracy or the like.

We claim:

1. An apparatus for feeding ultrafine powder in quantitative batch operation comprising:

an ultrafine powder storage silo;

a pneumatic transportation tank additionally provided with a receiving unit for receiving the ultrafine powder from said storage silo and a pressurized air feeding unit;

a discharge unit for discharging the ultrafine powder from said pneumatic transportation tank;

a pneumatic transportation conduit for pneumatic transportation of said discharged ultrafine powder;

a weigher provided at another end of said pneumatic transportation conduit for receiving the pneumatically transported ultrafine powder, weighing it, and feeding it to a destination to be fed;

a returning conduit extending from said weigher to said ultrafine powder storage silo;

a bypass conduit for connecting said pneumatic transportation conduit with said return conduit through a regulating valve; and a control unit for adjusting an amount of the ultrafine powder discharged from said pneumatic transportation conduit, a fed amount of said pressurized air, and opening of said regulating valve of said bypass conduit on a basis of a weighed value at said weigher.

2. An apparatus for feeding ultrafine powder in quantitative batch operation according to claim 1, wherein said ultrafine powder storage silo is laterally disposed, and ultrafine powder transferring units are horizontally disposed on a lower bottom portion and an upper portion from an intermediate step within the silo, respectively.

3. An apparatus for feeding ultrafine powder in quantitative batch operation according to claim 2, wherein a vibrator is provided on said silo near said ultrafine powder transferring units provided on a lower bottom surface of said ultrafine powder storage silo.

4. An apparatus for feeding ultrafine powder in quantitative batch operation according to claim 1, wherein said ultrafine powder storage silo has an inner size of 5.0 m or less in height.

\* \* \* \* \*